US006314364B1

(12) United States Patent
Nakamura

(10) Patent No.: US 6,314,364 B1
(45) Date of Patent: Nov. 6, 2001

(54) MOBILE INTERACTIVE WORKSTATION

(76) Inventor: Hisatsugu Nakamura, 13-3-1001 Roppongi 5-Chome, Tokyo (JP)

( * ) Notice: Subject to any disclaimer, the term of this patent is extended or adjusted under 35 U.S.C. 154(b) by 880 days.

(21) Appl. No.: 08/571,342

(22) Filed: Dec. 12, 1995

(30) Foreign Application Priority Data

Dec. 12, 1994 (JP) .................................................. 6-332026

(51) Int. Cl.[7] .................................................. G01C 21/26
(52) U.S. Cl. .......................... 701/200; 701/213; 340/995
(58) Field of Search ............................ 364/423.098, 443, 364/449.1, 449.7, 450, 460, 461, 436; 340/990, 995, 435, 903; 382/154, 106; 348/42, 51, 115, 116

(56) References Cited

U.S. PATENT DOCUMENTS

| 4,843,463 | * | 6/1989 | Michetti ................................ 348/148 |
| 4,847,772 | * | 7/1989 | Michalopoulos et al. ............ 340/937 |
| 4,970,653 | * | 11/1990 | Kenue ................................ 364/461 |
| 5,027,200 | * | 6/1991 | Petrossian et al. ..................... 348/118 |
| 5,177,685 | * | 1/1993 | Davis et al. .......................... 364/443 |
| 5,208,745 | * | 5/1993 | Quentin et al. ................. 364/551.01 |
| 5,229,941 | * | 7/1993 | Hattori ................................ 318/587 |
| 5,289,321 | * | 2/1994 | Secor ................................... 348/118 |
| 5,307,419 | * | 4/1994 | Tsujino et al. ....................... 382/153 |
| 5,452,217 | * | 9/1995 | Kishi et al. .......................... 340/990 |
| 5,467,284 | * | 11/1995 | Yoshioka et al. .................... 364/461 |
| 5,483,953 | * | 1/1996 | Uemura et al. ............... 364/424.027 |
| 5,517,412 | * | 5/1996 | Unoura ................................ 364/460 |
| 5,530,420 | * | 6/1996 | Tsuchiya et al. ..................... 340/435 |
| 5,557,254 | * | 9/1996 | Johnson et al. ..................... 340/426 |
| 5,574,443 | * | 11/1996 | Hsieh ................................. 340/901 |
| 5,596,319 | * | 1/1997 | Spry .................................... 340/903 |
| 5,610,821 | * | 3/1997 | Gazis et al. ........................ 364/444.2 |

OTHER PUBLICATIONS

Behringer et al., "Simultaneous Estimation of Pitch Angle and Lane Width from the Video Image of a Marked Road", IEEE Sep. 1994, pp. 966–973.*
Article "Warnings for Drowsy Drivers" by Dennis Normile, Popular Science, Sep. 1995, p. 42.
Article "PC Cards" by Stephen Bigelow, Electronics Now, Jun. 1995, pp. 31 and 32.

* cited by examiner

*Primary Examiner*—Tan Nguyen
(74) *Attorney, Agent, or Firm*—James G. O'Neill

(57) ABSTRACT

A system to enable the operator of a vehicle to view road and traffic conditions straight ahead, while simultaneously viewing road and traffic conditions behind the vehicle to achieve safe, strain-free vehicle operation. The system comprises: a plurality of compact video cameras (1, 2 and 3) utilizing CCD video imaging devices; positioned for wide angle viewing of front and rear traffic conditions. The output from the CCD devices are controlled and processed by a computer (6) containing an interactive CD-ROM disc and drive device (7). The images output by the personal computer are displayed on a horizontally extended display (5), positioned just above the surface of a dashboard of the vehicle. Safety margins are calculated and established by the interactive computer system and vocal warning is issued by the computer when the safety margins on the displays are exceeded.

14 Claims, 1 Drawing Sheet

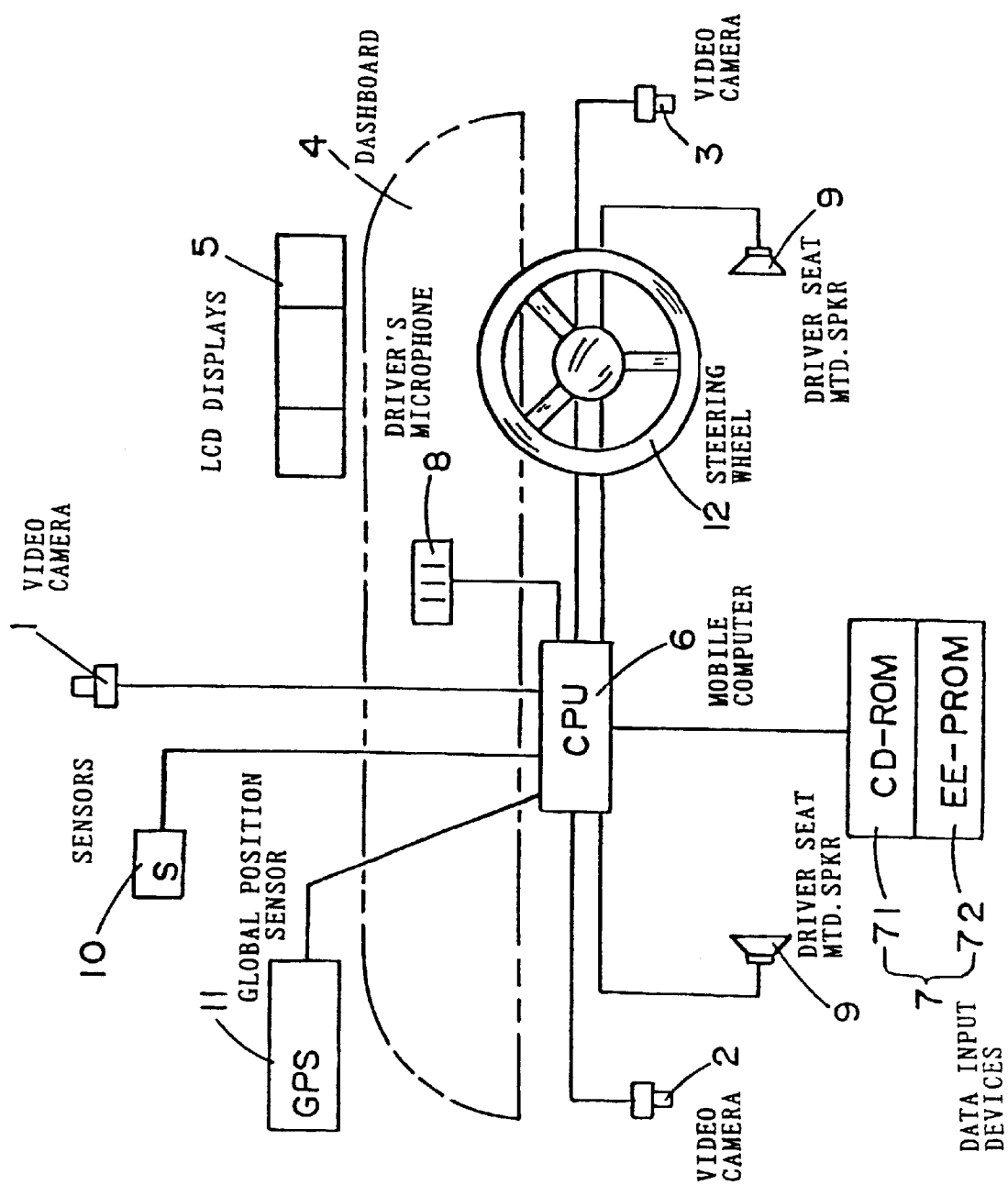

MOBILE INTERACTIVE WORKSTATION

BACKGROUND OF THE INVENTION

1. Field of the Invention

This invention relates generally to vehicle safety systems, and more particularly, to an improved vehicle navigation system using interactive multi-media hardware and software.

2. Description of Related Art

Heretofore, the use of industrial TV cameras has not been interactive, and their use has been restricted to special vehicles and large ferryboats. However, the majority of vehicles, such as cars and trucks still rely on mirrors: for example, rear-view and door-mounted or side mirrors for viewing traffic at the rear or side.

When traveling at high speed, it becomes necessary to pay close attention to road and traffic conditions ahead, while simultaneously checking on vehicles approaching from behind. This requires the driver or operator to glance at the rear-view and side-view mirrors, by shifting one's line of sight.

Modern car design has popularized door or side mounted mirrors which are impossible to look at by a driver while looking at traffic straight ahead.

Some large size trucks and buses utilize industrial TV cameras for rear viewing on a video display mounted adjacent the operator's seat. However, this type of installation is not interactive and will not produce warnings. Furthermore, such installations are used mainly when backing up the vehicle to cover blind spots of the rear view mirror system.

In recent years, with the advent of compact computers, CD-ROM drives and navigation software, car navigation systems for displaying static information, such as road maps and local TV programs have been marketed. However, these systems are designed for viewing by a navigator in the vehicle, and not the driver of the vehicle. Hence, these systems are not designed for interactive control of the vehicle by and with the driver.

Some navigation systems have been designed to respond to voice commands, mainly for switching peripherals, and not for actively issuing vocal warnings directed to the operator.

Vocal instructions or warnings from a computer system, when issued through a conventional automotive speaker system—not located at ear-height—are difficult to hear above the noise generated as a vehicle travels along a roadway.

The inherent problems in conventional systems, overcome in a typical embodiment of the present invention, are as follows:

Operation of vehicles, small boats, and light aircraft utilizing conventional rear view and side view mirrors places a heavy strain on the driver. As a result, one may conclude that current car navigation systems containing voice operation systems are not as safe as the system of the present invention, which produces visual indications, as well as interactive voice warnings, directed at ear height, by coherent sound producing speakers.

SUMMARY OF THE INVENTION

It is, therefore, an object of the present invention to provide a means of safely allowing an operator of a vehicle to navigate in today's crowded environment.

It is another object of the present invention to provide an improved navigation system for a vehicle, utilizing interactive video, a personal computer and software.

It is a further object of the present invention to provide a plurality of video cameras interconnected to a personal computer linked with other means to provide an improved vehicle navigation system.

These and other objects and advantages are achieved by providing an improved interactive vehicle navigation system including a multiple of video-signal generating cameras, each containing a CCD image-generating device driven synchronously by a common sweep signal fed throughout the system.

The system may include a horizontally elongated multiple image display device, displaying switched images transmitted from the cameras; and the display device may be mounted so as to display the images directly above the dashboard of a vehicle.

The present invention has application in any type of vehicle, such as road and off-road vehicles, small boats and yachts, helicopters and light aircraft. In particular, the present invention relates to the safe navigation of a vehicle through the application of interactive multimedia hardware and software.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawing, in which:

The drawing diagrammatically depicts the preferred elements of an embodiment of the invention.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified vehicle navigation system.

Referring now to the drawing there shown is an embodiment of the subject invention applied to an operator controlled and navigated vehicle interactive computer controlled system, in a right hand drive vehicle. It is to be understood, of course, that the system of the present invention may be used in a left hand drive vehicle, or any other vehicle, now known, or which becomes available in the future. As shown in the drawing, a compact CCD-imaging video camera 1 is principally positioned for viewing in front of the vehicle over a wide angle. Further CCD-imaging video cameras, such as 2 and 3, are positioned principally for side and rear viewing over a wide angle. The video cameras are interconnected to a personal computer 6 so that CCD generated images are processed and controlled by the personal computer. The processed interactive images in the personal computer are then displayed on, a display, such as a horizontally extended LCD display 5 mounted above a dashboard and a control wheel 12 of a vehicle. The display 5 provides either a see-through reflection on a vehicle windshield or direct viewing on a screen of the display.

The computer 6, is preferably a compact personal computer, with multiple input/output ports and buffer devices, and is interconnected between the front and rear viewing video cameras and the multiple image display device 5, to provide interactive displays.

A data input system 7, having one or more EE-PROM (71) and/or CD-ROM (72) devices, may be used for loading the computer with pre-selected software, such as DOS data and interactive program material, and for storing/recording clipped and edited interactively obtained global/local multimedia information.

The system also includes a directional microphone system 8, for inputting operator voice commands, and a coherent-directional sound field producing speaker system 9, for directing interactive vocal instructions at ear-height, to the operator's ears.

Further to what has been described above, vehicle travel data and environmental data may be received by various sensors 10, connected to the computer to further enhance interactive information exchange between vehicle travel conditions, environmental conditions, real-time navigational conditions and the operator of the vehicle.

Displaying of a wide angle view of traffic behind or following the vehicle, on a horizontally extending display 5, in front and above the dashboard of the vehicle, allows the driver to keep his eyes on the traffic and road conditions ahead, while simultaneously viewing the traffic at the rear. This removes a strain on the operator, resulting in safer driving.

By inputting the video signals from the CCD image sensors of the video cameras into the computer and by digital processing thereof, in real-time, utilizing interactive displays, guidelines or road limits may be provided, or an enlarged image of a truck ahead when its brake lights go on and a sudden slowdown is observed, as by overrunning frame limits computed and superposed on the displayed image. If any of this occurs, an alarm signal may be made to trigger a vocal warning through the above described speaker system.

The data provided by the CD-ROM device 71 and EE-PROM device 72 may be input by utilizing pre-recorded CD-ROM discs and specific EE-PROM cards.

The vocal commands to the computer are input through directional microphone 8, and the output from the computer through the coherent sound producing speakers 9, mounted for personal ear-level listening.

In the preferred embodiment of the invention shown, the video camera 1 is positioned in the front center upper part of the vehicle, to provide a wide-angle front-view of road conditions. Video cameras 2 and 3 can be positioned on both sides of the rear window of a vehicle, or can be mounted on the rear viewing side door mirrors.

The horizontally elongated LCD display device 5 may be of any desired size, and can be mounted on the top surface of the dashboard for easy viewing, or can be mounted with the display face flush to the surface of the dashboard to reflect on the surface of the windshield for see-through viewing. In both cases, the vertical center-line of the display should coincide with the center of a steering wheel 12 of the vehicle.

As shown in the drawing, the display may be divided into three (3) sections, for simultaneous display of the images from the three cameras. Fewer or more sections may be used depending on the number of cameras used, or what information is being displayed.

The personal computer 6 connected between the video cameras 1, 2 and 3, and the three-sectioned display 5, is provided with the necessary ports, buses, buffers, etc., as required, and known to those skilled in the art, for interfacing with these peripherals.

One important aspect of the system of this invention, is the CD-ROM drive 71 and EE-Prom device 72 and other devices that provide interactive capability to the system through, ROM discs and cards containing the necessary system control data, and the interactive program data (software).

Over and above visual interactivity, the directional microphone 8 is positioned in front of, or off-center, but aimed at the mouth of the operator, and the directional coherent-sound speakers 9 are positioned on both sides of the operator directed towards the operator at ear level. Voice commands, and audio data are input to the interactive audio processing system, while vocal warnings, and audio data instructions are interactively supplied to the operator.

Further to what has been described, real-time data from one or more sensors 10, sensing the vehicle's navigational conditions, such as propulsion/travel, surround/ambience, etc., and local and global positional data. Further sensors for receiving the local and global positional data are represented by the Global Positioning Sensor (GPS) 11.

An example of a simple application of an embodiment of the present invention comprises: the displaying of wide-angle video-images received by video-cameras 2 and 3 on the multiple-image viewing LCD video display device 5, located just below the operator's line of sight.

However, as shown, the cameras in the preferred embodiment comprise one front viewing video CCD camera 1, and two rear viewing CCD cameras 2 and 3. All of the cameras and their displays are driven synchronously. Their images are controlled and processed by the central computer unit 6. Moreover, the image from the left rear-viewing camera is preferably displayed on the left side frame of the display, while the image from the right rear viewing camera is displayed on the right side frame of the display, and the image from the central viewing camera is displayed on the center frame of display 5.

It should be apparent from the above description that in the event that the rear viewing cameras should be mounted on the outer edge of each adjustable side door mirror, simultaneous front and rear viewing of travel conditions will become possible, and a cause for serious accidents, mainly due to eye strain and poor attention to road and traffic conditions on the part of the operator, will be eliminated Furthermore, since the CCD image sensors employed in the cameras are sensitive to infra-red light, viewing of heat radiating bodies not discernable in the dark becomes possible.

A Global Positioning System 11, connected to central computer unit 6, provides visual displays on display 5, and if broadcast, vocal instructions and warning can be clearly heard above the high background noise of high speed travel, or of the vehicle's audio system.

Both the microphone and the speakers employed to interact with the operator, are of the compact vertically arrayed transducer type that receive, and/or radiate sound coherently with low attenuation. When this type of speaker system becomes employed in vehicle audio systems, further reduction in the audio power required by the interactive system will become possible. This is because coherent in-phase sound is clear and cuts through background noise, like coherent laser light.

This invention is also applicable to automatic pilot systems or where computer aided automated control loops are employed in individual control systems contained in the overall man/machine interactive control system. As for example, in the case of auto-pilot systems in aircraft.

The central computer unit (CPU) 6 provides instructions and warnings in the following manner. Real-time images and data are received by cameras 1, 2 and 3. Monitoring data from other sensors 11 are input and buffered and subsequently processed and stored in memory. A CD-ROM containing in-travel navigational information, from home base to the destination, is prepared or selected from available navigational CD-ROMs. Discrepancies between an actual travel log, and prepared travel plans, can then be easily found by scanning a video travel log and the actual monitoring data, such as travel time, odometer readings, actual traffic conditions, gas consumption, etc. A revised and edited travel record can then be published as an accurate objective record that can be used interactively in any compatible CD-interactive navigation system.

In the preferred embodiment of the present invention, the CD-ROM read/write optical memory disc device 71 is supported by a PC-CARD memory device 72 which provides for recording of any identified and/or copyrighted matter on an EE-PROM card.

An important function of the present invention lies in the capacity of the compact computer system to make a continuous optical disc recording of all visual and audio data processed and edited into a final master travel record. The black-box or "voice recorder" will become obsolete with the development of a compact "AV-interactive black-box recorder."

The disclosed embodiment specifies a single directional microphone 1 located in front of and facing the operator for direct pickup of voice commands issued by the operator. Two speakers are arranged close to the ears of the operator, such as by being built into the operator's seat, approximately at ear level. This does not restrict the use of other videocameras or microphones for pickup of external scenes or sounds, which add important information to a travel log. The mounting of compact speakers of the coherent sound emitting type is not restricted to the above mentioned speakers, but may include externally mounted speakers to provide computer aided warnings to vehicles following too closely. Other features may be added to this interactive monitoring system.

In the particular embodiment, display 5 is described as a horizontally extended display. This does not limit the concept to a single LCD display, but includes a display device comprised of three separate LCD displays. The display is not restricted to direct viewing but includes the concept of a see-through display with the display focused and reflected from the back surface of the vehicle's windshield.

The simple fact that more and more cars are switching from door mounted rear or side view mirrors for rear viewing, to front fender mounted mirrors proves this point. Wide angle video viewing by a videocamera mounted on the outer edge of an adjustable door mounted rear view mirror proves the practical value of this invention, as applied to automobiles.

Furthermore, the wide angle rear coverage eliminates the need for the current internal overhead rear view mirror. Front viewing video camera 1 can be easily mounted on the backside of the current internal overhead rear view mirror, thus providing a practical solution to the mounting problem of the cameras.

The video image signals output by the front and rear viewing CCD cameras 1, 2 and 3 are fed into the central computer unit CPU 6 where the images are analyzed from time to time. These images are processed and compared by the CPU with real-time monitoring data obtained from other sensors and filed by the CPU. When the compared data in memory reaches a critical point, a vocal warning is issued through the audio warning system. The vocal command system sets up the CPU to perform the functions pre-set by the operating system software. In this case, the CPU is set-up to issue a warning when the image of a car in front becomes enlarged until it overruns the margins of a distance limiting frame superimposed on the front car's image.

Experience has taught that loud voice commands are most effective in drawing one's attention to act.

The enormous memory capacity of the CD-ROM disc provides sufficient capacity to store all of the signal data connected with a particular travel log, however, automatic disc changers may be employed where more than one disc is required.

The EE-PROM card provides overall data for successful startup and setup of the "interactive" AV computer system, including identification data of the persons involved in producing a master disc, use of proprietary software and other pertinent information concerning the produced master record.

As described in the above, the man/machine interaction in both audio and video perception, has been made possible by the interactive CD-ROM disc, and development of the software and hardware that enables fuller exploitation of its enormous memory capacity.

The most significant difference between passive man/machine interactive systems and active man/machine interactive systems is in the field of accident prevention and security.

In the field of safety, the difference between passive go, no-go or red-green indication lights, and active go-wait-stop lights that observe the traffic entering the control zone and time the waiting period (according to the traffic) should be significant. Controlling the flow of traffic by real time observation by satellite should be possible. In the field of security, tampering with door locks or windows, or hauling away could be sensed and a warning issued over a telephone link, and/or external speaker system. For safe driving, application of the brakes together with vocal warnings to other vehicles could be issued when the operator has lost control and automatic steering that prevents or corrects skidding may be made to take over.

In the case of an accident, a complete CD-interactive recording of the direct and indirect data from the sensors, and cameras will provide accurate objective evidence. This alone should establish still unknown causes, and should serve to prevent the hundreds of preventable man/machine related traffic accidents occurring everyday. Not only a voice recording of the operator's actions, but a complete data recording of the interaction between man/machine and road/travel conditions, is presented for the first time by exploiting the present CD-interactive disc system and its concept.

Those skilled in the art will appreciate that various adaptations and modification of the just-described preferred embodiments can be configured without departing from the scope and spirit of the invention. Therefore, it is to be understood that, within the scope of the appended claims, the invention may be practiced other than as specifically described herein.

What is claimed is:

1. A mobile, multi-media workstation system for a vehicle comprising:
    a plurality of video cameras driven with a common time base to produce synchronized video signals; said plurality of video cameras being mounted for wide angle simultaneously viewing of traffic and travel conditions forwardly and rearwardly of a vehicle;
    a horizontally elongated LCD video display device mounted above a dashboard of said vehicle and equipped with signal processing hardware to simultaneously display a plurality of video images of said synchronized video signals;
    a personal computer connected between said plurality of video cameras and said horizontally elongated LCD video display device, to provide interactive control;
    a program inputting EE-PROM card device, and a video/audio data inputting and recording CD-ROM device connected to said personal computer, enabling signal processing and interactive system control by said personal computer;
    a directional microphone connected to said personal computer for inputting voice commands issued by an operator of the vehicle to control said mobile, multi-media workstation system; and
    a speaker system comprised of at least one speaker located close to the operator, at ear level, connected to said personal computer to provide voice messages and warnings output by said personal computer in response to programmed criteria.

2. The workstation of claim 1, further including a plurality of sensors connected to said personal computer for monitoring the vehicle travel and running conditions, local and global position and weather conditions, emergency traffic conditions, and to provide data that is processed, edited and stored in realtime by said personal computer.

3. The workstation of claim 2 wherein a vocal warning is output from a coherent sound producing speaker system connected to said personal computer and located at ear level in close proximity to the operator, when predetermined criteria are sensed by either the video cameras or said plurality of sensors.

4. The workstation of claim 3 wherein recorded data in said personal computer can be read out and further processed to provide comparison data that is edited into interactive visual or vocal messages and commands issued to said operator through said coherent sound producing speaker system.

5. The workstation of claim 1 wherein recorded data in said personal computer can be read out and further processed to provide comparison data that is edited into interactive visual or vocal messages and commands issued to said operator through said speaker system.

6. The workstation of claim 5 wherein said speaker system is a coherent sound producing speaker system located at ear level in close proximity to the operator, and said coherent sound producing system outputs a vocal warning when predetermined criteria are sensed by said plurality of video cameras.

7. The workstation of claim 1 wherein said speaker system is a coherent sound producing speaker system located at ear level in close proximity to the operator, and said coherent sound producing speaker system outputs a vocal warning when predetermined criteria are sensed by either said plurality of video cameras or a plurality of sensors connected to said personal computer.

8. The workstation of claim 1 wherein there are three video camera; a first of said three video cameras facing forwardly of a vehicle; and a second and third of said three video cameras facing rearwardly of a vehicle.

9. A navigation system for a vehicle comprising:
    three video imaging means driven with a common time base to produce synchronized video images;
    said three video imaging means being mounted for wide angle simultaneous viewing of traffic forwardly and rearwardly of the direction of travel of said vehicle;
    a video display means mounted above a dashboard of said vehicle;
    said video display means having signal processing means to simultaneously display said synchronized video images;
    computer means interconnected between said plurality of video imaging means and said video display means to provide interactive control thereof;
    a program inputting means connected to said computer means, to enable said computer means to process received signals and interactively control said navigation system;
    a directional microphone means connected to said computer means for inputting voice commands; and
    a speaker system directed towards an operator of said vehicle to provide audio output from said computer means.

10. The navigation system of claim 9 wherein a first of said three video cameras faces forwardly in said vehicle; and a second and third of said three video cameras faces rearwardly in said vehicle.

11. The navigation system of claim 10, further including a plurality of external sensors connected to said computer means for monitoring vehicle travel and running conditions, local and global position and weather conditions, emergency traffic conditions, and to provide data that is processed, edited and stored in real-time by said computer means.

12. A vehicle having a multi-media workstation system comprising:
    a plurality of video cameras driven with a common time base to produce synchronized video signals, mounted for wide angle simultaneous viewing of traffic and travel conditions forwardly and rearwardly of said vehicle;
    a horizontally elongated LCD video display device mounted above a dashboard of the vehicle and equipped with signal processing hardware to simultaneously display a plurality of video images of said synchronized video signals;
    a personal computer connected between said plurality of video cameras and said LCD video display device, to provide interactive control of said multi-media workstation system;
    a program inputting EE-PROM card device, and a video/audio data inputting and recording CD-ROM device, connected to said personal computer and enabling signal processing and interactive multi-media workstation system control by said personal computer;
    a directional microphone connected to said personal computer for inputting voice commands issued by an operator of said vehicle to control said multi-media workstation system; and a coherent sound producing speaker system comprised of at least two speakers connected to said personal computer and located close to said operator, at ear level, to provide audio output from said personal computer in response to sensing of programmed criteria.

13. The system of claim 12, further including a plurality of sensors connected to said personal computer for monitoring said vehicle travel and running conditions, local and global position and weather conditions, and emergency traffic conditions; said plurality of sensors inputting data that is processed, edited and stored in realtime by said personal computer.

14. The system of claim 12 wherein there are three video cameras; a first of said three video cameras being mounted in said vehicle so as to face forwardly thereof; and a second and third of said three video cameras being mounted in said vehicle so as to face rearwardly thereof.

\* \* \* \* \*